United States Patent [19]
Guerci et al.

[11] Patent Number: 5,406,291
[45] Date of Patent: Apr. 11, 1995

[54] PASSIVE EMITTER LOCATION SYSTEM

[75] Inventors: Joseph R. Guerci, Astoria; Raymond Goetz, Commack; John DiModica, Deer Park, all of N.Y.

[73] Assignee: Grumman Aerospace Corporation, Bethpage, N.Y.

[21] Appl. No.: 131,608

[22] Filed: Oct. 5, 1993

[51] Int. Cl.⁶ .............................................. G01S 3/14
[52] U.S. Cl. ................................. 342/451; 342/443; 342/424
[58] Field of Search ............... 342/451, 424; 364/443

[56] References Cited

U.S. PATENT DOCUMENTS

| | | | |
|---|---|---|---|
| 4,746,924 | 5/1988 | Lightfoot | 342/453 |
| 5,045,860 | 9/1991 | Hodson | 342/451 |
| 5,343,209 | 8/1994 | Sennott et al. | 342/357 |
| 5,343,212 | 8/1994 | Rose et al. | 342/424 |

*Primary Examiner*—Thomas H. Tarcza
*Assistant Examiner*—Dao L. Phan
*Attorney, Agent, or Firm*—Bacon & Thomas

[57] ABSTRACT

A passive emitter location system is capable of performing emitter location autonomously from a single airborne observation platform and includes a bearing measurement system, a system for measuring doppler induced frequency shifts, and means for estimating the emitter location based on non-simultaneous measurement of the bearing and frequency using extended Kalman filters preferably initialized by a single measurement delayed initialization procedure.

5 Claims, 2 Drawing Sheets

PASSIVE EMITTER LOCATION SYSTEM

BACKGROUND OF THE INVENTION

1. Field Of the Invention

This invention relates to a system for locating the source of an electromagnetic wave emission, and in particular to a system for locating radar emissions.

2. Description of Related Art

An extremely important problem encountered in many tactical military engagements is the need to locate hostile radar, and in particular the need to provide autonomous emitter location from a single airborne observation platform. Conventional passive emitter location techniques do not adequately address this problem.

Traditional emitter location techniques are generally based on the passive interception and processing of the hostile radar to yield a bearing or bearing-rate (or, in the case of phase interferometry, a phase or phase-rate) to the emitter, which can subsequently be used to determine the emitter's location by triangulation. However, it is well known that these triangulation techniques suffer from an acute sensitivity to angle measurements, and therefore require extremely large antenna apertures. In addition, conventional triangulation requires many noncoincident measurements, resulting in an unacceptably long convergence time to achieve acceptable ranging performance.

In order to decrease the convergence time of a bearing-only passive emitter location system, it has previously been proposed to apply a technique known as single-measurement delayed initialization (SMDI) to a Cartesian formulation extended Kalman filter (EKF). The basic premise of extended Kalman filtering is to filter an a posteriori state error covariance update equation about a filtered state estimate, rather than about an actual measurement. The initial estimate is obtained, using SMDI, by first multiplying the a priori probability density function (PDF), which represents the uncertainty concerning the emitter's location, by a first-measurement PDF in order to narrow the uncertainty before initialization. The SMDI technique therefore delays the initialization of the EKF until the single-measurement a posteriori PDF (SMAP-PDF) is obtained, after which the EKF is initialized with the mean of the SMAP-PDF and the state error covariance matrix derived from the SMAP-PDF.

Initially, there is an extremely large uncertainty concerning the imager's location, which one could take to represent the 1-$\sigma$ circular error ellipse of a jointly gaussian PDF. However, after a single measurement has been taken, the uncertainty region is reshaped as a result of superimposing the antenna pattern onto the a priori PDF. The resulting distribution is the intersection of the a priori CEP or circular error PDF with the antenna pattern. Assuming that the measurement is statistically independent of the a priori state estimate, the resulting single measurement a posteriori PDF is the product of the a priori PDF and the single-measurement PDF, which is essentially just the normalized antenna pattern.

In order to simplify the SMDI initialization, information is extracted from the SMAP-PDF by rotating the ownship-centered coordinate system such that one of the axes is aligned with the first measured bearing, setting the SMDI EKF estimate of position $(x_0, y_0)$ equal to $(R_0, 0)$, where $R_0$ is the original a priori mean range estimate, and by setting the SMDI EKF covariance matrix equal to a diagonal matrix with $(\sigma_x, \sigma_y)=(\sigma_r, R\sigma_\Theta)$, where $\sigma_x$ and $\sigma_y$ are the x and y standard deviations associated with SMDI estimate $(x_0, y_0)=(R_0, 0)$, $\sigma_\Theta$ is the 1-$\sigma$ antenna beam width, and $\sigma_R$ is the standard deviation associated with the original a priori mean range estimate. This is equivalent to assuming that the target lies along the first measured bearing, with the associated standard deviations, and that the along-axis and cross-axis are uncorrelated.

While this technique greatly reduces the convergence time relative to the same filter without SMDI, the bearings-only system still inherently involves triangulation and, therefore, an acute sensitivity to angle measurements as well as a relatively large antenna aperture are still required to achieve acceptable range performance.

An alternative technique is to measure the Doppler induced frequency shift imposed on the radar's carrier frequency due to relative changes in relative position between the emitter and sensor. This technique eliminates the need for large antennas, but still requires a relatively long time to converge to an acceptable emitter location accuracy, and requires rapid maneuvering of the antenna platform or aircraft in order to collect the induced frequency shifts necessary for acceptable ranging performance.

Recently, there have been attempts to combine bearing and frequency measurements to achieve maximum passive emitter location performance, for example as described in K. Becker, "An Efficient Method of Passive Emitter Location", in *IEEE Transactions on Aerospace and Electronic Systems*, Vol. 28, No. 4, October 1992. These techniques are based on the simultaneous measurement of bearing and frequency, and require the measurement errors to be independent. However, the latter requirement can only be justified if two separate sensors are used which are also significantly separated in space. Thus, these beating-frequency (BF) techniques are not suited to the aforementioned single airborne observer platform case.

SUMMARY OF THE INVENTION

It is accordingly a first objective of the invention to provide a passive emitter location system in which the convergence time to achieve acceptable ranging performance is relatively short.

It is a second objective of the invention to provide a passive emitter location system which has a short convergence time and which nevertheless eliminates the need for large antennas.

It is a third objective of the invention to provide a passive emitter location system which has a short convergence time, does not require a large antenna, and in which only a single sensor is necessary to achieve acceptable ranging performance.

It is a fourth objective of the invention to provide a system capable of locating an electromagnetic emitter from a single observation platform, and in particular from a single airborne observation platform.

These objectives of the invention are achieved by a system which combines bearing and frequency measurements to achieve maximum passive emitter location performance, but in which bearing and frequency measurements are not made simultaneously. This is accomplished in a preferred embodiment of the invention by switching between measurements using a multiplexer controlled by decision logic having inputs from both the bearing measurement and frequency measurement systems, the bearing and frequency processors which process the results of these measurements sharing a common initialization which utilizes this information to limit the range of possibilities and thereby increase the rate of convergence. In a particularly preferred embodiment of the invention, the multiplexed beating frequency system (MBF) utilizes an SMDI initialization procedure applied to EKF processors.

The bearing-frequency system of this embodiment can be used on a single non-maneuvering airborne observation platform, requires only a single receiving antenna, and thus greatly reduces the amount of hardware required to perform passive emitter location.

DETAILED DESCRIPTION OF THE PREFERRED EMBODIMENTS

Figure 1:
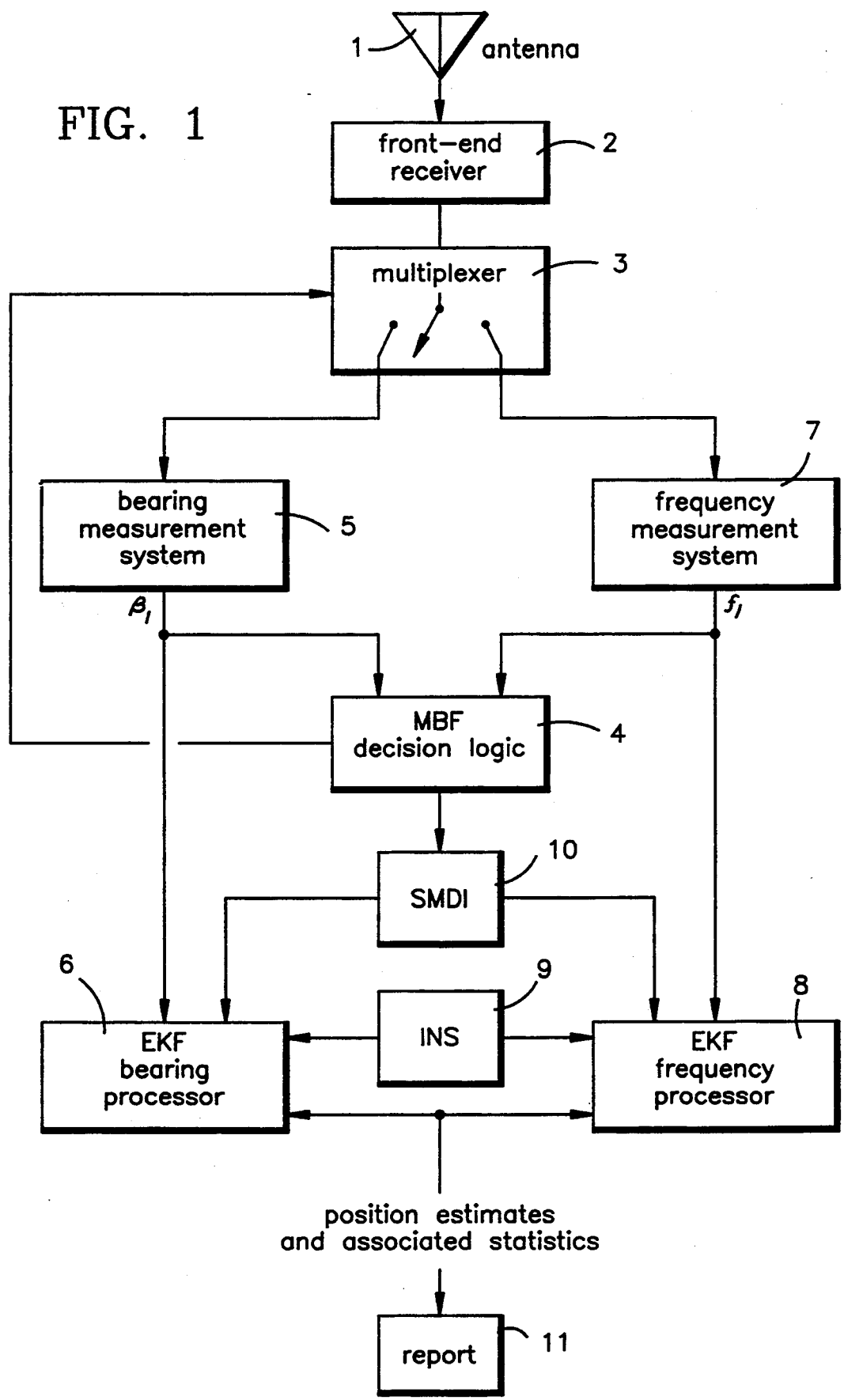
FIG. 1 is a functional block diagram of a passive emitter location system constructed in accordance with principles of a preferred embodiment of the invention.

FIG. 1 is a functional block diagram of a passive emitter location system constructed in accordance with the principles of a preferred embodiment of the invention. Those skilled in the art will appreciate that the individual hardware components of the system are conventional, except as indicated below, and that those skilled in the art of radar signal processing will easily be able to implement the system once the principles described below are mastered.

Initially, the incoming radar signal is intercepted by an antenna 1 and front-end receiver 2 of known type, which in turn is connected via a multiplexer 3 controlled by decision logic processor 4 to a bearing measurement system 5 and a frequency measurement system 7. Decision logic processor 4 determines which processing channel the incoming signal should be switched to by multiplexer 3. In the illustrated embodiment, processor 4 detects when a measurement has been made by one of measurement systems 5 and 7, and then causes multiplexer 3 to switch the incoming signal to the other of the two measurement systems in order to process the signals alternately, although it will be appreciated by those skilled in the art that any switching scheme which does not lead to simultaneous processing of the incoming signal is allowed. Both the bearing measurement system 5 and the frequency measurement system 7 are conventional and a number of suitable measurement systems for extracting bearing or frequency information from a radar signal for further processing are available. Each measurement system 5 and 7 is connected to supply the extracted bearing or frequency information to one of EKF processors 6 and 8.

Assuming that the alternate processing mode is employed, processor 4 first causes an SMDI controller 10 to seed EKF bearing and frequency processors 6 and 8 using the SMDI procedure described above in order to to prevent EKF divergence due to poor initialization information. After the SMDI procedure has been completed, subsequent measurements in a known manner are combined with own ship inertial navigation system (INS) measurements in a known manner using an INS processor 9, and are processed sequentially by the two EKFs. The emitter position location estimates and associated statistics output by the two EFK processors 6 and 8 may then be displayed in a conventional manner.

Processors 6 and 8 preferably operate as follows:

The overall process of determining the emitter's location, speed (expressed in Cartesian coordinates), and transmitter frequency, which is assumed to be constant, is described by the equation $$x(k+1) = Ax(k) + v(k) \tag{1}$$

where A is the corresponding state transition matrix (the identity matrix, in the case of a stationary emitter), while $v(k)$ is the "process" noise term, which is assumed to be zero mean, white, and of a finite variance for both EKF processors, and which includes the effects of INS errors, transmitter frequency instabilities, and possibly target jitter.

The general equation for both types of measurements is given by $$y_k = h(x(k)) + n(k) \tag{2}$$

For the bearing EKF processor, the basic trigonometric equation applies:

$$h(x(k)) = \tan^{-1}\left(\frac{x_k}{y_k}\right) \tag{3}$$

where $x_k$, $y_k$ are the relative emitter location coordinates. For the frequency EKF processor, the doppler shift equation applies:

$$h(x(k)) = f_0\left[1 + \frac{v}{c}\cos\left(\tan^{-1}\left(\frac{x_k}{y_k}\right)\right)\right] \tag{4}$$

where $f_0$ is the emitter's transmitter frequency, and v/c is the ratio of the relative emitter speed to the speed of light. The corresponding measurement noise $n(k)$ is assumed to be zero mean, white, and of finite variance for both EKF processors.

The EKF filters provide estimates for predicting the state of the emitter and its covariance matrices. The caret ( ) over the state variable x in the following expression of the process equation indicates that this is an estimated quantity, while the expression of the process equation (1) in the form x(t/s) indicates that x at time t is being estimated with observations up to time s:

$$x(k+1/k) = A_k x(k/k) \tag{5}$$

The error covariance matrix $P(k+1/k)$ for this estimate of x at sample $k+1$, based on data input from sample k, is given by the following formula:

$$P(k+1/k) = A_k P(k/k) A_k' + Q_k \tag{6}$$

where $Q_k$ is the initial covariance matrix of the measured state variable (initially obtained by SMDI).

After sample $k+1$ is obtained and supplied to the EKF processors, the estimated state of x is given by the EFK update formula $$x(k+1/k+1) = x(k+1/k) + K_k(H(x(k+1) - h(x(k+1)) \tag{7}$$

where the feedback gain matrix $K_k$ of the EKF filter, with variance $\gamma_k$, is given by the formula $$K_k = \frac{P(k + 1/k)h'_k}{[h_k P(k + 1/k)h'_k + \gamma_k]} \tag{8}$$

and the error covariance matrix P is equal to $$P(k+1/k+1) = (1 - K_k h_k)P(k+1/k)(1 - K_k h_k)' + K_k \gamma_k K_k' \tag{9}$$

Those skilled in the an will appreciate that these equations are matrix Ricatti-type equations where all the matrices may be time-varying.

Assuming a stationary target, the respective coordinates of $$h_{k'} = [h_1 h_2 h_3] \tag{10}$$

for the bearing EKF processor 6 are given by $$h_1 = \frac{-x_k}{x_k^2 + y_k^2} \tag{11}$$

$$h_2 = \frac{y_k}{x_k^2 + y_k^2}$$

$$h_3 = \frac{-(c\sqrt{x_k^2 + y_k^2} + v_0 x_k)}{v_0 y_k f_0}$$

where $v_0$ is the observer's speed, and the respective coordinates of $h_k'$ for the frequency EKF processor 8 are given by, $$h_1 = \frac{-x_k}{x_k^2 + y_k^2} f_0 \frac{v_0}{c} \cos\left[\tan^{-1}\left[\frac{y_k}{x_k}\right]\right] \tag{12}$$

$$h_2 = -\frac{y}{x_k} h_1$$

$$h_3 = 1 + \frac{v_0}{c} \sin\left[\tan^{-1}\frac{y_k}{x_k}\right]$$

Figure 2:
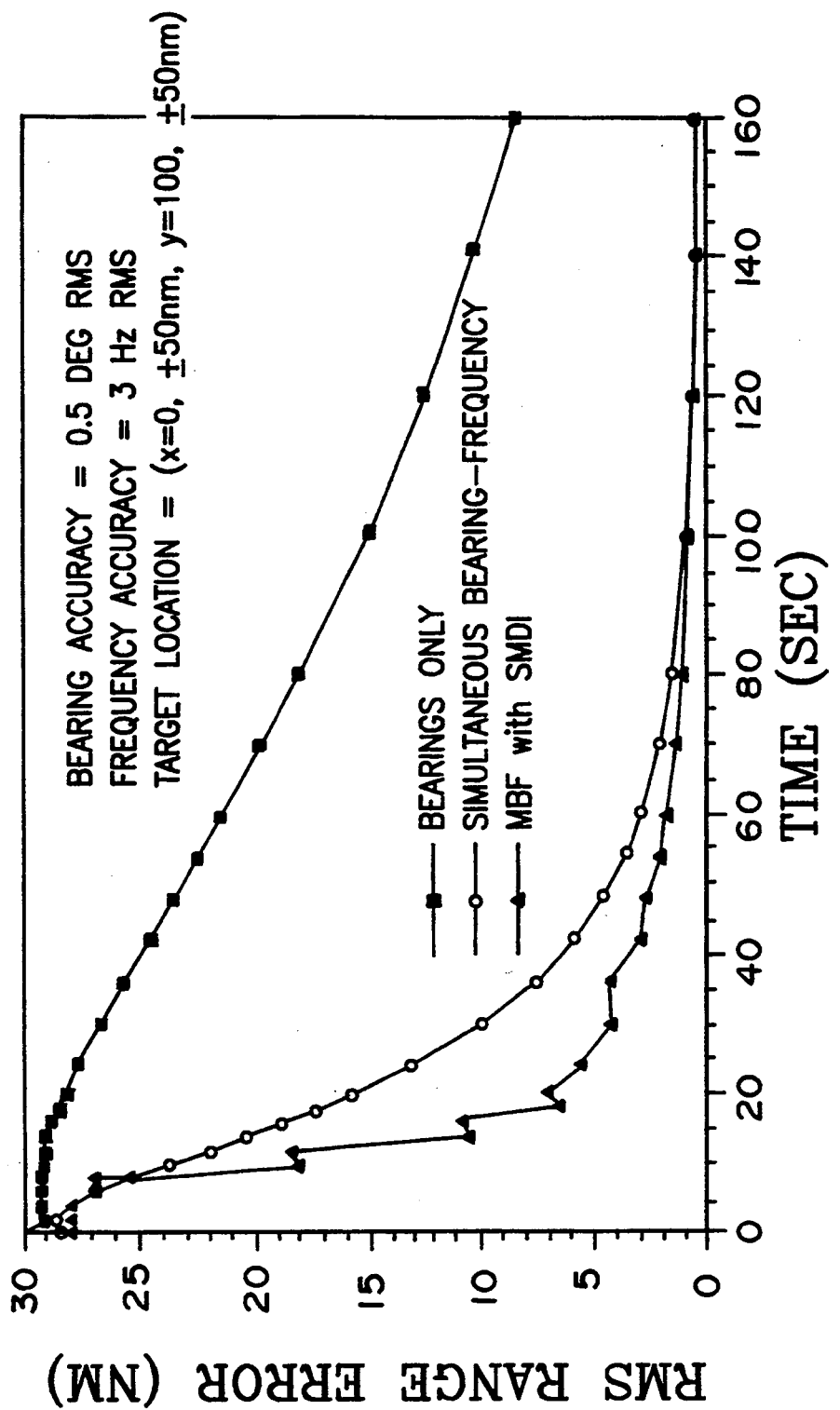
FIG. 2 is a graph showing ranging performance comparisons between the system of the preferred embodiment (MBF with SMDI) and prior systems (bearings only and simultaneous bearing-frequency).

An example of the range in performance which is achievable by the preferred processor, with optional SMDI, is shown in the graph of FIG. 2. The processor with SMDI clearly outperforms the ideal simultaneous processing case, and also yields significantly better results that the bearings-only case. The observer platform speed for the results depicted in FIG. 2 is a constant 450 knots, and the initial heading is perpendicular to the initial line-of-sight. The frequency-only technique actually diverges for the case shown because the observer is not maneuvering.

Having thus described a specific preferred embodiment of the invention, it will be appreciated by those skilled in the an that variations of the described embodiment are possible within the scope of the invention, and consequently it is intended that the invention not be limited to the specifically disclosed embodiments or drawing figures, but rather that it be defined solely by the appended claims.

We claim:

1. A passive emitter location system, comprising:
   receiving means for receiving an electromagnetic signal emitted by an emitter of unknown location;
   measurement means for non-simultaneous measurement of a bearing and a frequency of said received signal, said measurement means comprising a bearing measurement system and a frequency measurement system connected to the receiving means via it multiplexer, and further comprising means for controlling the multiplexer to supply the received signal at different times to said bearing measurement system and said frequency measurement system;
   location estimation means for estimating a location of the emitter, said means including both a bearing processor and a frequency processor; and
   means for initializing said processors.

2. A system as claimed in claim 1, wherein said multiplexer supplies said signal alternately to said respective measurement means.

3. A system as claimed in claim 1, wherein said processors are extended Kalman filter processors.

4. A system as claimed in claim 1, wherein said initializing means includes means for performing a single measurement delayed initialization in order to provide a rapidly convergent, closed form solution to the extended Kalman filter equations for both processors.

5. A system as claimed in claim 1, wherein said receiving means is an antenna fixed on a single airborne observation platform.

* * * * *